Sept. 6, 1955 J. FEASEY 2,717,017
PACKAGING METHODS AND MEANS
Filed March 2, 1953
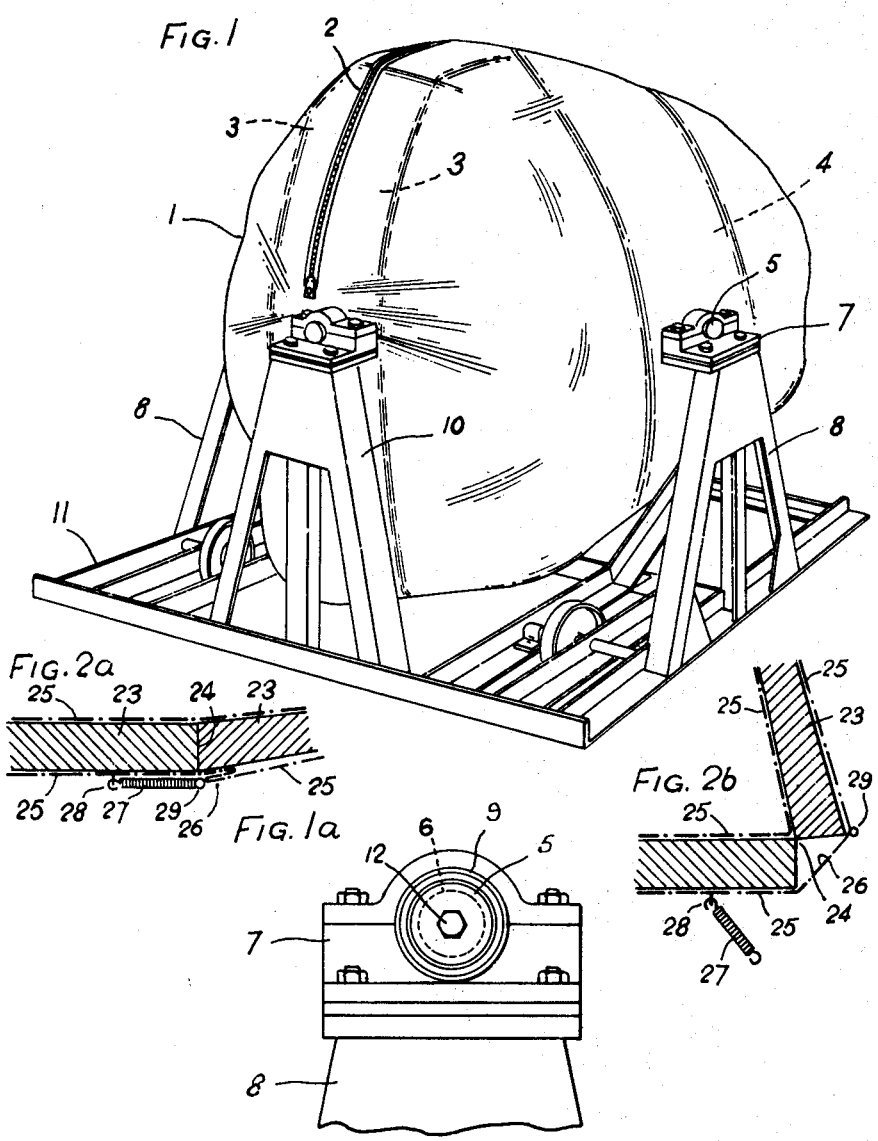
INVENTOR
John Feasey
By Morris & Bateman
ATTORNEYS

United States Patent Office 2,717,017
Patented Sept. 6, 1955

2,717,017

PACKAGING METHODS AND MEANS

John Feasey, Hemel Hempstead, England, assignor, by mesne assignments, to R. A. Brand & Co. Limited, Bridge Mills, Pendleton, England Application March 2, 1953, Serial No. 339,708

Claims priority, application Great Britain April 2, 1952

2 Claims. (Cl. 150—52)

This invention relates to means for the packaging of articles for protection thereof, especially from corrosion.

The so-called strippable coating process for the preservation of stores and equipment has become well known and it is also well known to use the so-called web-coating process in connection therewith. The process of strippable coating using webbing applied on tapes over an article, has a number of inherent disadvantages, for example it is difficult to strip off the coating so that it can be put back into place again. Moreover if paint on the article is such as to be affected by the solvents of the webbing or coating solution, damage to it is liable to occur during the application of the strippable coating.

Furthermore it is often necessary in packaging, especially for transport, to provide means particularly in order to take the weight of the article packaged, without damage to the package. The article may be an aircraft which may be supported by the wheels, or an aircraft engine which may be supported by trunnions on an engine stand consisting of pedestals mounted on a trolley.

In the case of an aircraft with folding wings it is furthermore a requirement to be able to package the aircraft so that the wings can be folded or extended without breaking the moisture vapourproof package and without leaving loose areas of the package.

It is the object of the present invention to provide improved means for overcoming the stated disadvantages and fulfilling the stated requirements. The present invention is particularly applicable to the preservation of a large number of identical articles.

The invention accordingly provides a sealable protective plastic cover for packaging an article, said cover conforming to the general shape of the article and having at least one sealable opening for receiving the article and being provided with at least one reinforcing element for transmitting support for the weight of the article, said reinforcing element being at least in part included within the plastic skin of the cover.

Reinforcing elements may be provided in the form of shoes for supporting the wheels of an aircraft or of caps for covering trunnions on an aircraft engine.

The invention is illustrated in the accompanying drawing in which:

Fig. 1 is a perspective view of an aero-engine packaged in a cover according to the invention and supported on a stand, Fig. 1a is an enlarged elevation of the top of a pedestal of the stand, Fig. 1b is an axial section at an engine trunnion, Fig. 2a shows diagrammatically the hinge of a folding wing of an aircraft with extensible cover and Fig. 2b the same with the wing folded and cover extended.

Referring to Fig. 1, 1 is a cover enclosing an aero engine and 2 is an opening therein shown closed by a sliding clasp fastener and sealed by spraying over with the plastic material of the cover. 3 and 4 are fabric reinforced areas of the cover. To consider, in particular, the area 4 of the cover, this includes two oppositely disposed metal caps, of which one is shown at 5 (see also Figs. 1a and 1b), which are provided to house trunnions of the engine, one of which is shown at 6, and to provide a bearing surface in the cover between the said trunnions and the brackets 7 on the pedestals 8 with the interposition of silentblocs 9 of normal type. The pedestals 8 and a third pedestal 10 of similar function are fixed to a trolley 11 thus forming an engine stand. 12 is a set screw for adapting the desired relative positions of the trunnion and the metal cap 5 which, as shown in Fig. 1b, has its brim portion 13 included within the plastic skin. The plastic material of the cover may consist of any of the known strippable coating materials. It is known that a plurality of coats, for example sprayed coats, of a composition are usually necessary to form a covering of the required thickness.

The cover may be made by using the webbing process over a frame or alternatively it may be made using a continuous former corresponding in shape to the engine and spraying the same with the outer coating composition without webbing. In either case the caps and other inserts are placed in position after the spraying of a required preliminary number of coats of outer coating composition and spraying is then continued to incorporate the brim portions of the caps within the skin of the plastic cover. If necessary the inner crown portions of the caps are cleared of plastic to receive the trunnions.

In order to insert the engine into the cover it is lowered on slings, the caps are fitted over the trunnions and the whole is allowed to settle in the brackets and is then fixed. After the sliding clasp fastener is closed it is sealed by spraying over with the plastic material of the cover. The caps may likewise be completely sprayed over prior to fixing. An alternative method of sealing entails the use of an adhesive material of a different nature or formulation from the plastic spraying solution used for the cover. Thus a strip of plastic may be stuck over the fastener by means of a rubber solution. All known features of moisture vapour proof packaging can be adopted, including the insertion of desiccant and/or vapour phase inhibitor.

With reasonable handling, a cover as described may be used repeatedly.

Figs. 2a and 2b illustrate a cover provided with tucks which can be let out as desired. An aircraft wing 23 folds at 24 and is provided with a cover 25 which includes a portion 26. In the extended position of the wing, shown in Fig. 2a, this portion 26 is formed into a tuck which is held together by an elastic tie member 27, which may be of rubber. This latter is firmly anchored in the plastic skin at 28 and is detachably secured at 29 to an eye which is likewise firmly fixed in the skin. In the folded position of the wing, shown in Fig. 2b, this elastic tie member is released from the eye, allowing the tuck in the skin to be let out to accommodate the increased volume occupied by the wing in this position.

It is obvious that a cover according to this invention can take on any other suitable shape to accommodate another type of article.

In the case of relatively small areas of the cover which require to be fitted to the article by tensioning means to prevent slackness, such as might cause flapping in a wind, such tensioning means may be permanently anchored in the skin of the cover on both sides of the area.

Covers produced according to this invention can easily be removed, replaced and resealed and can also be repaired as necessary by spraying in the known manner.

I claim:

1. A sealable protective plastic cover for packaging an article having trunnions by which the article is to be supported, said cover conforming to the general shape of the article and having at least one sealable opening for receiving the article and being provided, for each supporting trunnion of the article, with a reinforcing element for transmitting support for the weight of the article to said trunnion, each reinforcing element being at least in part included within the plastic skin of the cover.

2. A cover as claimed in claim 1, in which at least one reinforcing element is of the shape of a hat with a cylindrical crown portion for accommodating a trunnion and a flat circular brim portion.

References Cited in the file of this patent
UNITED STATES PATENTS

| | | |
|---|---|---|
| 635,840 | Bimm | Oct. 31, 1899 |
| 1,619,556 | Aaron | Mar. 1, 1927 |
| 2,418,868 | Cole et al. | Apr. 15, 1947 |
| 2,459,400 | Williams | Jan. 18, 1949 |
| 2,475,135 | Haven | July 5, 1949 |
| 2,549,050 | Brophy et al. | Apr. 17, 1951 |